US011858336B2

(12) United States Patent
Ripa et al.

(10) Patent No.: US 11,858,336 B2
(45) Date of Patent: Jan. 2, 2024

(54) HOUSING FOR A FRONT FACE MODULE OF A MOTOR VEHICLE

(71) Applicant: Valeo Systemes Thermiques, Le Mesnil Saint Denis (FR)

(72) Inventors: Jerome Ripa, Le Mesnil Saint Denis (FR); Stephan Andre, Le Mesnil Saint Denis (FR); Emmanuel Henon, Le Mesnil Saint Denis (FR); Pierre Alexandre Langlet, Le Mesnil Saint Denis (FR); Sergio Da Costa Pito, Le Mesnil Saint Denis (FR)

(73) Assignee: Valeo Systemes Thermiques, Le Mesnil Saint-Denis (FR)

( * ) Notice: Subject to any disclaimer, the term of this patent is extended or adjusted under 35 U.S.C. 154(b) by 237 days.

(21) Appl. No.: 17/414,669

(22) PCT Filed: Dec. 4, 2019

(86) PCT No.: PCT/FR2019/052915
§ 371 (c)(1),
(2) Date: Jun. 16, 2021

(87) PCT Pub. No.: WO2020/128199
PCT Pub. Date: Jun. 25, 2020

(65) Prior Publication Data
US 2022/0016972 A1 Jan. 20, 2022

(30) Foreign Application Priority Data
Dec. 19, 2018 (FR) ...................................... 1873297

(51) Int. Cl.
*B60K 11/08* (2006.01)

(52) U.S. Cl.
CPC .................................. *B60K 11/08* (2013.01)

(58) Field of Classification Search
CPC ........ B60K 11/08; B60K 11/04; B60K 11/085
(Continued)

(56) References Cited

U.S. PATENT DOCUMENTS

| 7,022,008 B1 * | 4/2006 | Crocker | ................. | B60H 1/242 |
| | | | | 237/12.3 B |
| 7,455,136 B2 * | 11/2008 | Pleune | .................. | B60K 11/04 |
| | | | | 165/41 |

(Continued)

FOREIGN PATENT DOCUMENTS

| CN | 207984549 U | 10/2018 |
| DE | 102013103551 A1 | 10/2014 |

(Continued)

OTHER PUBLICATIONS

International Search Report with Written Opinion in corresponding International Application No. PCT/FR2019/052915, dated May 4, 2020 (10 pages).

(Continued)

*Primary Examiner* — Hau V Phan (57) ABSTRACT

The invention relates to a housing (3) for a front face module (2) of a motor vehicle (1), defining an air duct (4) for the flow of an air stream, said housing comprising: —an openwork structure (30) having a plurality of openings (32) defined by ribs (34); —a lining (36) which is securely attached to the openwork structure (30) and covers the openings (32) so as to form a wall which is airtight to the air stream. The invention also relates to a method for manufacturing such a housing and to a front face module (2) comprising such a housing.

9 Claims, 3 Drawing Sheets

(58) Field of Classification Search
USPC .......................................................... 180/68.1
See application file for complete search history.

(56) References Cited

U.S. PATENT DOCUMENTS

| | | | | |
|---|---|---|---|---|
| 8,104,559 | B2* | 1/2012 | Kisse ........................ | F01P 5/06 |
| | | | | 180/68.1 |
| 8,479,853 | B2* | 7/2013 | Verbrugge ............... | F01P 11/10 |
| | | | | 180/68.2 |
| 8,919,864 | B2* | 12/2014 | Kojima ................ | B60K 11/085 |
| | | | | 296/180.5 |
| 2005/0023057 | A1* | 2/2005 | Maeda ..................... | F28F 1/128 |
| | | | | 180/68.1 |
| 2006/0048986 | A1* | 3/2006 | Bracciano ................ | B60H 1/28 |
| | | | | 180/69.2 |
| 2013/0133963 | A1* | 5/2013 | Ajisaka ................. | B60K 11/04 |
| | | | | 180/68.1 |
| 2013/0248265 | A1* | 9/2013 | Wolf .................... | B60K 11/085 |
| | | | | 180/68.1 |
| 2017/0349040 | A1* | 12/2017 | Nagaosa ........... | H01M 8/04753 |
| 2018/0347909 | A1* | 12/2018 | Shimota ................ | B60K 11/04 |

FOREIGN PATENT DOCUMENTS

| | | |
|---|---|---|
| EP | 1243455 A2 | 9/2002 |
| FR | 3016598 A1 | 7/2015 |
| JP | S60-036716 A | 2/1985 |
| JP | 2008-173896 A | 7/2008 |

OTHER PUBLICATIONS

Notice of Reason for Rejection issued in Japanese Patent Application No. 2021-535645, dated Sep. 30, 2022 (11 pages).

* cited by examiner

HOUSING FOR A FRONT FACE MODULE OF A MOTOR VEHICLE

The invention relates to a housing for a front-end module of a motor vehicle as well as to the method for manufacturing such a housing. The invention also relates to the front-end module comprising such a housing as well as to the motor vehicle comprising such a module.

Generally, a motor vehicle comprises an air inlet that takes the form of an opening situated on the front end of said motor vehicle. The incoming air is used to enable a heat exchange between it and the cooling system of the motor vehicle, said cooling system being situated near the front end of said vehicle. More specifically, the air that enters the engine compartment of the motor vehicle is guided to the cooling system of said motor vehicle to enable a heat exchange between the incoming air and the heat exchanger of the cooling system. It is important to minimize the losses of the air stream between the air inlet and the heat exchanger. Specifically, any air stream entering the inside of the vehicle, and escaping to the engine compartment before it has contributed to the heat exchange inside the motor vehicle, has a negative influence on the air resistance coefficient of said motor vehicle.

In a known manner, the housing houses a motor-fan unit for circulating the air stream from the air inlet to the air outlet. The housing also houses heat treatment means for heating and/or cooling the air stream prior to its distribution inside the passenger compartment. By way of example, the heat treatment means, that is to say the heat exchangers, can comprise an evaporator which is intended to cool and dehumidify the air stream passing through it, as well as a condenser, which is intended to heat any air stream that would pass through it.

Such housings are usually made of plastics material and define an internal volume in which the heat exchangers and the motor-fan unit are arranged.

These housings are of relatively high thickness, in order to be able to support the heat exchangers, and therefore relatively expensive in plastics material and relatively heavy in weight.

The object of the invention is to propose a plastics material housing of high rigidity relative to torsional and bending forces, while being particularly light.

For this, the invention proposes a housing for a front-end module of a motor vehicle, defining a duct for the flow of an air stream, said housing comprising
 a. A perforated structure comprising a plurality of openings delimited by ribs
 b. A skin secured to the perforated structure, covering the openings so as to form a wall impervious to the air stream The perforated structure having a plurality of openings will be lighter than a conventional front-end module while minimizing the losses of the air stream and having satisfactory rigidity thanks to the arrangement of these openings according to a given mesh forming thus a network of ribs connected to one another.

The skin, in order to seal the housing and to guarantee the flow of the air stream through the heat exchangers, is arranged so as to fill in, or plug, the openings. The skin being thinner than the perforated structure, this results in a considerable weight gain.

Other embodiments according to the invention propose that:
 a. the perforated structure comprises at least 5 openings all delimited by the ribs;
 b. the perforated structure comprises at least 10 openings all delimited by the ribs;
 c. the perforated structure comprises at least 20 openings all delimited by the ribs;
 d. the perforated structure comprises at least 30 openings all delimited by the ribs;
 e. the perforated structure comprises at least 40 openings all delimited by the ribs;
 f. the openings are at least partially arranged in a repeated pattern;
 g. the ribs are arranged at least partially in a honeycomb mesh;
 h. the ribs are at least partially arranged in a triangular mesh;
 i. the thickness of the perforated structure is greater than that of the skin;
 j. the thickness of the perforated structure is between 1 and 3 mm, more particularly between 1 and 1.5 mm, and the thickness of the skin is between 0.3 and 1 mm, more particularly between 0.3 and 0.7 mm;
 k. the perforated structure is made of a first material and the skin is made of a second material, the first and second materials being of different compositions;
 l. the skin includes an internal cavity;
 m. the openings are of different geometric shapes;
 n. the cumulative visible area of the ribs is less than the cumulative visible area of the openings, or in other words the cumulative visible area of the perforated structure is less than the cumulative visible area of the skin;
 o. the ribs protrude from the skin;
 p. the ribs are embedded at least partially, or even completely, in the thickness of the skin;
 q. the perforated structure is made in several parts not forming a continuity of material, each part being secured to one another through the skin,
 r. the width of the ribs is less than the width of the openings.

The invention also relates to a front-end module comprising such a housing.

The invention therefore also relates to the method for manufacturing the housing according to the invention. Said method comprises the following steps:
 a. Thermoforming step, where the second material of the skin is heated and then shaped in a mold; and
 b. Overmolding step, where the first material of the perforated structure is injected onto the skin so as to form a network of ribs with openings.

According to an additional embodiment, in particular in the case where the skin comprises an internal cavity, the invention also relates to the method for manufacturing a housing comprising the following steps:
 a. Extrusion step, where the second material of the skin is compressed and heated, then shaped in a mold;
 b. Blow-molding step, where air or an inert gas is blown within the second material resulting from the first step so as to create an internal cavity within the skin; and
 c. Overmolding step, where the first material of the perforated structure is injected onto the skin resulting from the second step so as to form a network of ribs with openings.

According to an additional embodiment, in particular in the case where the skin is an acoustic insulation material, according to the invention, said method comprises the following steps:

a. preheating at least one layer of skin of a second material different from the first material, for example the second material being an acoustic insulation material,
b. shaping said at least one layer of skin,
c. positioning said at least one layer of skin in an injection mold,
d. overmolding the structure at least around said at least one layer of skin by injection of the first material into the injection mold, and
e. demolding.

The term "different materials" is understood to mean materials of different compositions.

Such a method makes it possible to obtain, by overmolding, a structure of the housing in the first material and which comprises at least one layer of acoustic insulation material which fills the openings of the structure.

The invention also relates to a front-end module comprising a housing as described above. According to the invention, the module comprises an air inlet and an air outlet, at least one heat exchanger being arranged within the duct, a motor-fan unit being arranged downstream with respect to the air stream at the heat exchanger.

Other embodiments of the front-end module taken alone or in combination propose that:

a. a flap is arranged within the flow duct downstream of the thermal block with respect to the flow of the air stream;
b. the flow duct comprises an inlet and an outlet, said outlet being made up of at least two separate ducts, the flap being capable of shutting off each of said ducts;
c. a set of shut-off flaps capable of pivoting in rotation so as to vary the flow rate of the air stream is arranged in the flow duct upstream of the thermal block with respect to the flow of the air stream;
d. the thermal block is inclined relative to the set of shut-off flaps;
e. blades are arranged upstream and/or downstream of the thermal block with respect to the flow of the air stream;
f. the passage cross section of the flow duct widens from the inlet to the thermal block and narrows from the thermal block to the outlet.

The invention also relates to a vehicle comprising such a front-end module.

Other embodiments of the vehicle taken individually or in combination propose that:

a. the vehicle comprises an air inlet, optionally provided with a grille, the outlet of the flow duct of the front-end module comprises a discharge duct arranged to convey the air stream to the outside of the vehicle and a cooling duct arranged to convey the air stream to the engine compartment of the vehicle;
b. the vehicle further comprises an additional air inlet and an additional duct connecting said additional inlet to the discharge duct.

Further features and advantages of the invention will become apparent from reading the following description, with reference to the attached figures, in which.

The following embodiments are examples. Although the description refers to one or more embodiments, this does not necessarily mean that each reference relates to the same embodiment, or that the features apply only to one embodiment. Individual features of various embodiments can also be combined or interchanged in order to create other embodiments.

Figure 1:
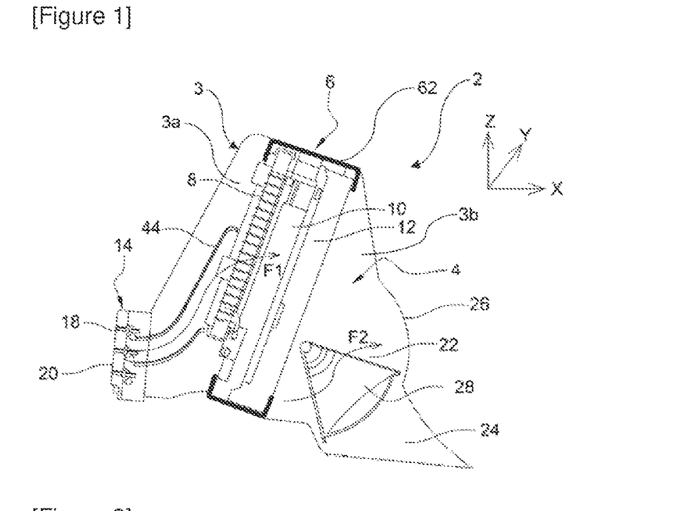
FIG. 1 corresponds to a schematic representation of a front-end module according to a profile view;
b.

FIG. 1 illustrates a front-end module 2 for an air inlet of a motor vehicle 1 according to the invention. The front-end module 2 extends in a longitudinal (X), transverse (Y) and vertical (Z) direction, for example with respect to the axes of the vehicle 1, when the front-end module is installed in the motor vehicle 1.

The front-end module 2 according to the invention comprises a housing 3, which will be described in more detail later, corresponding to an envelope, or even a sheath, thus defining, by its walls, a flow duct 4, in other words a flow channel, with an air inlet 20 and an outlet 22 in which an air stream flows.

The front-end module 2 of an air stream according to the invention further comprises a thermal block 6. The thermal block 6 comprises at least one heat exchanger intended to allow heat exchange between the air stream and the fluid circulating within the heat exchanger. As illustrated in FIG. 1, the thermal block 6 here comprises a first and a second heat exchanger 8, 10. The first heat exchanger 8 corresponds for example to a condenser, while the second heat exchanger 10 corresponds for example to a radiator. The thermal block 6 further comprises a motor-fan unit 12 corresponding to a fan with blades and an associated motor so as to be able to suck and release an air stream through the front-end module 2, even when the vehicle 1 is stationary. The thermal block 6 also comprises a carrier frame 62, corresponding to a rigid structure, more precisely a rigid plastics material frame with four uprights delimiting a surface in which the heat exchangers 8, 10 and said motor-fan unit 12 are arranged. In order to ensure the continuity of the flow duct 4, the housing 3 is attached to the carrier frame 62 in a sealed fashion. In other words, the carrier frame 62 ensures the continuity of the flow duct 4 or, in other words, the carrier frame corresponds to part of the flow duct 4.

The front-end module 2 according to the invention may further comprise a shut-off device 14 comprising a set of shut-off flaps 18 capable of pivoting in rotation so as to vary the flow rate of the air stream, said shut-off device 14 being arranged in the flow duct 4 upstream of the thermal block 6 with respect to the flow of the air stream. The shut-off device 14 further comprises a support frame 16 having bearings so as to carry the shut-off flaps 18.

Each shut-off flap 18 comprises an axis of rotation embodied by a journal that is inserted into the bearings of the support frame 16. The axes of rotation allow the shut-off flaps 18 to switch from an open configuration to a closed configuration. The open configuration, or in other words opening a shut-off flap 18, consists of placing (by rotation) the shut-off flaps 18 so that they provide as little opposition as possible to the passage of the air stream while orienting it appropriately. As shown in FIG. 1, in the open configuration, the shut-off flaps 18 are arranged in a horizontal position, in other words they extend in a longitudinal (X) and transverse (Y) direction, and thus ensure a maximum flow rate of the air stream, the air inlet 20 being freed. The closed configuration, or in other words closing a shut-off flap 18, consists of placing the shut-off flaps 18 so that they provide, by means of their front surface, as much opposition as possible to the flow of the air stream F, in conjunction with the other shut-off flaps 18. In this configuration, the shut-off flaps 18 are arranged in a vertical position, in other words they extend in a transverse (Y) and vertical (Z) direction, and thus ensure a minimum or even zero flow rate of the air stream, the air inlet 20 being shut off. Of course, the shut-off flaps 18 are capable of adopting any intermediate position between these two configurations.

According to the invention, the housing 3 of the front-end module 2 comprises a perforated structure 30 (illustrated in FIG. 2) having at least partially a plurality of openings 32 and a skin 36 (illustrated in FIGS. 3 and 5) arranged in such a manner to fully fill, or seal, the openings 32 of the perforated structure 30.

Figure 2:
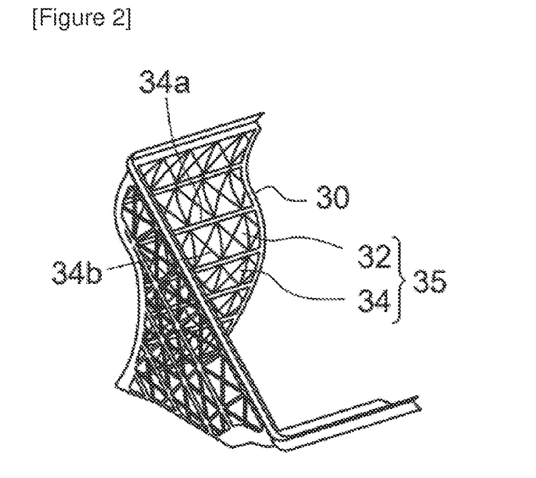
FIG. 2 illustrates a perspective view of part of the perforated structure of the housing according to the invention;
c.

The perforated structure 30 is partially illustrated in FIG. 2. The perforated structure 30 corresponds to a framework made of a first material, mainly a thermoplastic. The most commonly used thermoplastic corresponds to polypropylene filled with 20% talc (PP TD 20), although other polymers such as a polypropylene filled with 40% chalk (PP KD 40) could correspond for such use. The perforated structure 30 corresponds to a framework and is made of a rigid material in order to be able to resist torsional and bending forces.

As illustrated in FIG. 2, the perforated structure 30 has at least partially a plurality of openings 32, in other words, the perforated structure 30 has holes or apertures within its structure. The openings 32 are at least partially arranged in a repeated pattern. In other words, the structure of the perforated structure 30 defines a mesh by way of the ribs 34 and the openings 32 so as to define a set of cells 35 which may be of the same geometric shape or of a different geometric shape. A cell 35 corresponds to a set of an opening 32 and a plurality of ribs 34, two juxtaposed cells 35 possibly having one or more ribs 34 in common. The ribs 34 are also connected to one another and form nodes or junctions.

To summarize, according to the invention it is understood that the ribs 34 define an opening 32, in other words an empty space, so that when it is indicated that the opening or the cell has a certain shape, for example a triangular shape, this implies that three ribs 34 define between them an opening 32 which is in the shape of a triangle. Likewise, four ribs 34 will define between them an opening 32 of rectangular shape, and so on. In summary, a plurality of ribs 34 will define between them an opening 32 of polygonal shape. For simplicity, it will be said later that a cell 35, consisting of an opening 32 and a plurality of ribs 34, is of a geometric shape (polygonal, circular, etc.), the shape being a set of contours or a set of points defined by the ribs 34.

In other words, the perforated structure 30 defines a network of ribs 34 separated by openings 32 so as to define a framework, or a skeleton, that is robust and lighter. The network of ribs 34 thus defines a mesh which can be homogeneous (as illustrated in FIG. 2) or heterogeneous.

As illustrated in FIG. 2, the mesh, and therefore the cells 35, can be triangular or rectangular in shape or have any other polygonal shape. The mesh and therefore the cells 35 can also have other geometric shapes such as circles or even ellipses. The openings 32, and therefore the cells 35, are arranged at least partially according to a repeated pattern, for example according to a set of triangles. The cells 35, and therefore the openings 32, may have a geometric shape and dimensions that are identical or different.

In other words, the mesh can comprise various patterns, the openings 32, and therefore the cells 35, can be arranged in a honeycomb pattern, that is to say the openings 32, and therefore the cells 35, correspond to alveoli. The mesh can also be in a triangle pattern; we speak of triangulation where the ribs define triangles, and we can also speak of a mesh of the Eiffel Tower type.

Figure 3:
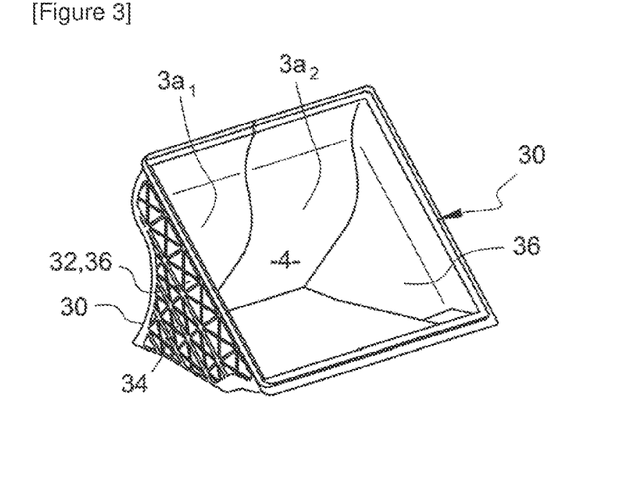
FIG. 3 illustrates a perspective view of part of the housing according to the invention;
d.

FIG. 3 illustrates the housing 3 according to the invention forming part of the flow duct 4. The housing 3 comprises a perforated structure 30, as defined above, and a skin 36. The skin 36 is arranged so as to fill, or shut off, the openings 32 so as to guarantee a seal within the flow duct 4 and to ensure that the entire air stream is routed to the heat exchangers 8, 10. It can be seen that the skin 36 corresponds to a uniform layer arranged all along the perforated structure 30.

Figure 4:
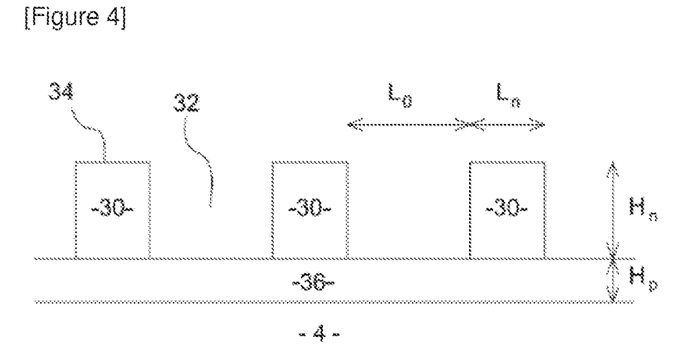
FIG. 4 illustrates a schematic sectional view of part of the housing according to the invention according to one embodiment;
e.

FIG. 4 schematically illustrates such an arrangement in a sectional view. The skin 36 corresponds to a uniform layer of a material, which is secured, or contiguous, to the perforated structure 30 so as to block the holes formed by the network of ribs 34 and ensure that the air stream remains confined within the flow duct 4.

The skin 36 is made of a second material which may be identical to the material of the perforated structure 30. However, preferably, the skin is made of a lighter material. As examples, we can cite various polymers such as Poly-Ethylene Terephthalate (PET), unfilled PolyPropylene (PP), Acrylonitrile Butadiene Styrene (ABS) or polystyrene (PS) or even a porous material, said material having or not having sound insulation properties.

According to another aspect of the invention, the skin 36 is made of a second acoustic insulation material different from the first material. The density of the second material is lower than that of the first material. The density of the second material is for example less than 1. The second acoustic insulation material can be a porous material.

In summary, the housing 3 according to the invention therefore comprises two layers, a first layer materialized by the perforated structure 30 made of a more rigid material and of higher density than that of the skin 36. This first layer at least partially has openings 32. The housing 3 further comprises a second layer materialized by the skin 36 made of a less rigid material and of lower density than that of the perforated structure 30.

The housing 3 according to the invention is such that the thickness $H_n$ (or the height) of the perforated structure 30, and more particularly the thickness of the ribs 34, is greater than that of the skin $H_p$, as illustrated in FIG. 4. Specifically, the thickness $H_n$ of the perforated structure 30, and more particularly the thickness of the ribs 34, is between 1 and 1.5 mm, preferably 1.2 mm, while the thickness $H_p$ of the skin 36 is between 0.3 and 0.7 mm, preferably 0.5 mm. The thickness $H_n$ of the rib 34 corresponds to the spacing measured between two parallel faces, namely that which is in full contact with the skin 36 and that which is opposite or parallel, as illustrated in FIG. 4. Analogously, the thickness $H_p$ of the skin 36 corresponds to the spacing measured on the face in contact with the ribs 34 and that opposite, or parallel, to the latter. In the case where the rib 34 is embedded in the skin 36, one can speak of a bare thickness $H_n$.

The housing 3 according to the invention is such that the width $L_n$ of the ribs 34 is less than the width $L_o$ of the openings 32, as illustrated in FIG. 4. The width $L_n$ of the ribs 34 corresponds to the spacing measured between the two parallel faces which are not fully in contact with the skin 36. The width $L_o$ of the openings 32 corresponds to the spacing measured between two parallel ribs 34, or in the case of a triangle-shaped opening, the width $L_o$ corresponds to the height of the triangle.

Figure 5:
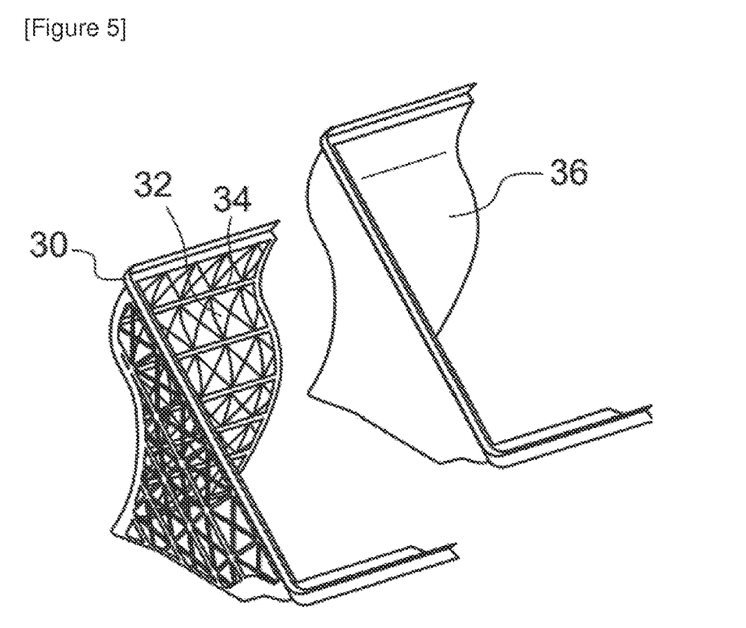
FIG. 5 illustrates a perspective view of part of the housing according to the invention;
f.

Obviously, and as illustrated in FIGS. 2, 3 and 5, the ribs 34 may have different widths and thicknesses from one another. As illustrated in FIG. 2, the horizontal ribs 34a can be thicker and/or wider than the diagonal ribs 34b, and vice versa.

The housing 3 may further include other openings which are not covered with a perforated structure or a skin to allow the introduction of various elements, for example an air filter, a protective grid for the heat exchangers, etc.

There are several ways to form the skin 36. The skin 36 can be formed by thermoforming. In other words, the second thermoplastic material generally in the form of a plate is heated so as to be softened and then, taking advantage of the ductility of the material in this softened state, the skin 36 is shaped in a mold. The perforated structure 30 is then overmolded on the skin 36. FIG. 4 illustrates a housing resulting from such a method.

The invention therefore also relates to the method for manufacturing the housing according to the invention. Said method comprises the following steps:
  a. Thermoforming step, where the second material of the skin 36 is heated and then shaped in a mold;
  b. Overmolding step, where the first material of the perforated structure 30 is injected onto the skin 36 so as to form a network of ribs with openings 32.

The skin 36 can also be formed by extrusion. For this, the second thermoplastic material passes through an extruder, which is to say that it is compressed and heated and then forced to pass through a die having the cross section of the part to be obtained, that is to say the skin 36, in order to perform stretching. The perforated structure 30 is then overmolded on the skin 36.

Figure 6:
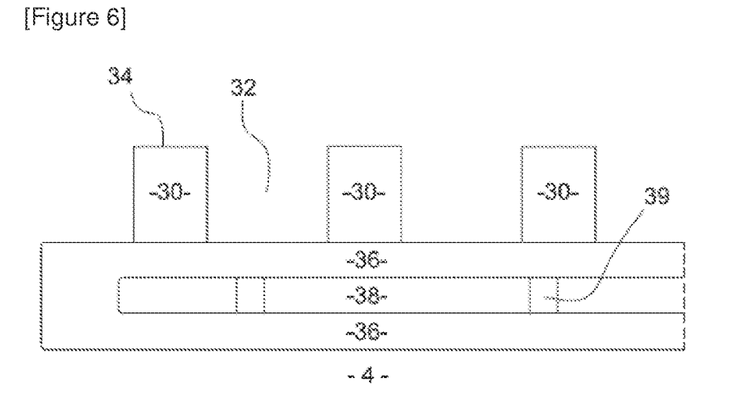
FIG. 6 illustrates a schematic sectional view of part of the housing according to the invention according to another embodiment;
g.

According to a variant, the skin can also be formed by an extrusion-blow-molding method, which is to say that following the extrusion, air or an inert gas is blown in such that the ductile material is pressed against the walls of the blow mold, thus making it possible to form a hollow skin 36. In other words, the skin 36 has an internal cavity 38. The perforated structure 30 is then overmolded on the hollow skin 36. FIG. 6 illustrates a housing resulting from such a method. Such a housing 3 can be particularly advantageous because, by virtue of the internal cavity 38 formed, the seal is always guaranteed and the air stream will flow only within the flow duct 4. It is therefore not necessary in this embodiment to add a sealing bead between the two half-housings. It is also possible to arrange spacers 39 within the internal cavity 38 in order to reinforce the structure of the skin 36.

The housing 3 according to the invention, and as illustrated in FIG. 1, is made in two parts, a first part 3a connecting the inlet of the housing 3, and therefore the air inlet 20 of the flow duct 4, where the shut-off device 14 is arranged, to the thermal block 6, in particular the carrier frame 62, and a second part 3b connecting the thermal block 6, and more precisely the carrier frame 62, to the outlet of the housing 3 and therefore to the air outlet 22 of the flow duct 4. The parts 3a, 3b of the housing comprise fastening means such as clips, hooks, screws with threaded shanks/nuts with internal thread, bolts, etc., of shapes that complement the fastening means arranged on the carrier frame 62. It will therefore be appreciated that the carrier frame 62 provides the continuity of the flow duct 4 between the two parts 3a, 3b of the housing 3.

According to other embodiments, the parts 3a, 3b can also comprise fastening means with complementary shapes so that each part 3a, 3b can be fastened to one another. A housing 3 as a single one-piece part forming continuity of material between the air inlet 20 and the air outlet 22 of the flow duct 4 can also be envisioned.

The housing 3, and more precisely each part 3a, 3b, according to the invention and as illustrated in FIG. 3, can comprise two half-housings $3a_1$, $3a_2$. Each pair of half-housings $3a_1$, $3a_2$ or $3b_1$, $3b_2$ together form part of the flow duct 4. In other words, the first pair of half-housings $3a_1$, $3a_2$, constitutes the part 3a of the housing 3, namely the part of the flow duct 4 connecting the inlet of the housing 3, in particular the air inlet 20 of the flow duct 4, where the shut-off device 14 is arranged, to the thermal block 6, in particular to the carrier frame 62. The second pair of half-housings $3b_1$, $3b_2$ (not illustrated) constitutes the second part 3b, namely the part of the flow duct 4 connecting the thermal block 6, and more precisely the carrier frame 62, to the outlet of the housing 3 and therefore to the air outlet 22 of the flow duct 4. Each pair of half-housings $3a_1$, $3a_2$, or $3b_1$, $3b_2$ comprises fastening means of complementary shape, such as clips, in which the female part is arranged on one half-housing $3a_1$ and the male part is arranged on the corresponding other half-housing $3a_2$, or vice versa. These fastening means may be reversible so that said half-housings are fixed to one another in a removable manner, in other words that said half-housings are separable by a reversible connection.

The invention therefore also relates to the method for manufacturing the housing according to the invention. Said method comprises the following steps:
  a. Extrusion step, where the second material of the skin 36 is compressed and heated and then shaped in a mold;
  b. Blow-molding step, where air or an inert gas is blown within the second material resulting from the first step in order to create an internal cavity within the skin 36;
  c. Overmolding step, where the first material of the perforated structure 30 is injected onto the skin 36 resulting from the second step so as to form a network of ribs with openings 32.

The invention therefore also relates to the method for manufacturing the front-end module 2 for a motor vehicle 1 comprising a housing 3 as described above.

Said method comprises the following steps:
  a. Step of inserting the thermal block, where the heat exchangers and the motor-fan unit are arranged within the flow duct defined by the housing resulting from the overmolding step as described above
  b. Mechanical assembly step, where the two housings are secured; the housings can be crimped, butted, screwed or even clipped together to form the flow duct 4.

Figure 8:
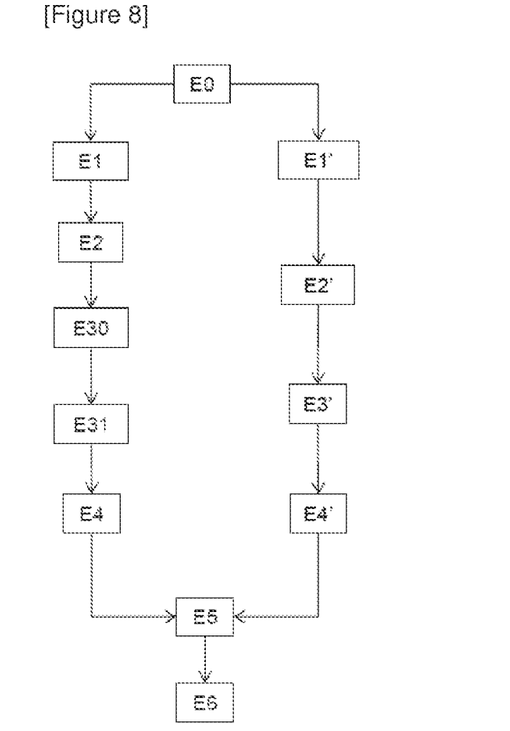
FIG. 8 is a flowchart of various steps of a method for manufacturing the housing of the installation.

Referring to FIG. 8, according to another embodiment, the step of preheating the layer of skin 36 is followed by the shaping step which breaks down into a sub-step E2 in which the preheated layer of skin 36 is placed in a thermoforming mold (not shown), then after allowing the layer of skin 36 to cool (sub-step E30), the cooled layer of skin 36 can be demolded (sub-step E31).

According to the particular example with a preheating temperature around 180° C., the layer of skin 36 can cool until reaching a temperature around 70° C.

The thermoformed layer of skin 36 can then be positioned in an injection mold in step E4.

According to this first embodiment, the shaping of the layer of skin 36 is carried out during the cooling of the layer of skin 36 in the thermoforming mold (not shown).

According to a second embodiment, the layer of skin 36 is preheated but is no longer thermoformed. In general, the layer of skin 36 is preheated so as to be softened and then, taking advantage of the ductility of the second material in this softened state, the layer of skin 36 is shaped in the injection mold for the overmolding of the perforated structure 30 on the layer of skin 36, and no longer in a thermoforming mold.

According to an alternative method, during the preliminary step E0, the second material can be cut and brought to be placed in a support such as a frame in step E1'. The frame holds the second material in position. For this purpose, it may include holding members, such as clamps, which hold the layer of second material, in other words the layer of skin 36 or more simply the skin 36.

The frame is for example arranged in front of the injection tool. The frame is arranged in front of a half-mold forming, with another complementary half-mold, the injection mold allowing overmolding of the perforated structure 30 on the layer made of a second material. More precisely, the frame can be placed between the two half-molds.

Furthermore, the frame may have various locations to hold several layers of second material.

The method then comprises, according to this second embodiment, a step E2' for preheating the frame holding the layer of second material. Said layer can be maintained in its initial form by the frame during the preheating step E2'. The preheating step E2' is therefore implemented using the frame.

For example, a heating drawer surrounds the frame holding the layer(s). The heating drawer comprises for example two resistors that will heat on each side of each layer. The frame is therefore inserted into the heating drawer during the preheating step E2'.

With such a heating drawer, the preheating temperature is controllable, for example around 180° C.

If the layer of second material has two different opposite faces, for example if the layer has on one of its faces a skin such as an airtight skin, the preheating temperature may be different for each face of the layer of skin 36.

At the end of the preheating step E2', the heating drawer is removed from the frame and returns to its initial position in step E3'.

The frame then releases the layer of preheated second material which is arranged in the injection mold, more precisely sandwiched between the two half-molds in step E4'.

In particular, the two half-molds move closer together until the frame holding the skin 36 is sandwiched between the two. The frame can for example move at the same time as one of the half-molds. When the injection mold closes, the clamps open to release the layer of second material and move aside, so that the layer of second material is completely caught and held in the injection mold.

The shaping of the layer of second material is done according to this second embodiment in the injection mold, by the imprint of the injection mold.

The two steps E5 and E6 then take place as described below.

The perforated structure is then overmolded on the thermoformed or preheated layer according to the first or second embodiment in the overmolding step E5.

During the overmolding step E5, the first material is injected into the injection mold at least in part around the layer of second material, in other words the skin 36, to produce the perforated structure 30 of the housing 3.

More precisely, the first material is injected to form the walls of the housing 3 and is also on the edges of the layer of acoustic insulation material intended to fill the openings 32, so that it is connected to the walls of the housing 3.

The preheating temperature is lower than the injection temperature.

Finally, in step E6, the perforated structure 30 is demolded. The perforated structure 30 obtained has a framework of the first material and comprises at least one layer of the second material, for example an acoustic or sound insulation material, which fills at least one opening 32 of the perforated structure 30.

According to an embodiment not shown, the housing 3 is made so that the perforated structure 30 is made in several parts not forming any continuity of material, and in particular in several flanks or uprights, with each part being secured to the others via the skin 36. For example, the lateral flank of the perforated structure is dissociated from the rear flank of the perforated structure, and the skin forming a continuity of material connects these flanks to one another, so that it is possible to fold the parts of the housing onto one another in order to be able to transport them more easily, the skin 36 being made of a flexible material.

Obviously, the perforated structure can be made in a single piece forming a continuity of material, in other words it is not possible to separate one part from the other without causing irreversible damage.

The front-end module 2 according to the invention further comprises a flap 28 arranged within the flow duct 4 downstream of the thermal block 6 with respect to the flow of the air stream. The flap 28 is of the drum type as illustrated in FIG. 1 as, given that such a regulation device extends over a large part of the width of the vehicle (Y axis) and can thus reach more than one meter, the drum flap, due to its structure that offers improved mechanical strength, is better suited to such use. Other flaps can be envisioned, such as a sliding flap (also known as a sliding door) comprising a sliding door on which there are arranged at least one rack and a gear that complements the rack, rotated about an axis by an actuator in order to move this flap, in particular in a translational movement, according to an embodiment not illustrated.

Still according to the invention, the thermal block 6 is inclined relative to the shut-off device 14. In other words, the mid-planes of the thermal block 6 and of the shut-off device 14 form an angle other than 0° (nonzero), particularly an angle in a range between 10° and 80°, more specifically in a range between 30° and 60°. Such an arrangement makes it possible to reduce the steric bulk of the front-end module 2.

Still according to the invention, it may prove to be advantageous for blades 44 to be arranged upstream and/or downstream of the thermal block 6 with respect to the flow of the air stream. The blades 44 correspond to air guides in the form of rounded walls defining corridors for the air stream in order to distribute the air stream F1 (FIG. 1) over the entire surface of the heat exchangers 8, 10 of the thermal block 6, resulting in improved thermal efficiency.

Still according to the invention, the passage cross section of the flow duct 4 increases from the air inlet 20 of the flow duct 4 to the thermal block 6 and narrows from the thermal block 6 to the air outlet 22 of the flow duct 4 in the direction of flow of the air stream. In other words, the passage cross section of the flow duct 4 has at least one dimension (width and/or height) that progressively increases along the length thereof, or as it draws closer to the thermal block 6 starting from the air inlet 20, in the direction of flow of the air stream. Analogously, the passage cross section of the flow duct 4 has at least one dimension (width and/or height) that decreases progressively along the length thereof, or as it becomes further away from the thermal block 6 going towards the air outlet 22, in the direction of flow of the air stream.

The housing 3 of the front-end module 2 according to the invention comprises at least one sealing means to prevent any air leakage outside the flow duct 4. In other words, the one or more sealing means ensure that the entirety of the air stream passing through the air inlet 20 of the flow duct 4 leaves through the air outlet 22 of the flow duct 4. The one or more sealing means can be arranged at various locations of the front-end module 2. Specifically, each sealing means is arranged at the interface of, that is to say between, two elements of the front-end module 2 that are disjointed, in other words, dissociable or even not forming a continuity of material. More precisely, in order to provide optimal sealing, the sealing means is arranged on the peripheral perimeter of each element that forms part of the dissociated flow duct 4. In other words, between two elements forming part of the flow duct 4, a sealing means is arranged on the peripheral connection surface at the peripheral edges of each of these elements.

The sealing means may therefore be arranged between each half-housing $3a_1$, $3a_2$ and $3b_1$, $3b_2$, and/or between a part $3a$ or $3b$ of the housing 3 and the carrier frame 62 and/or between each half-housing $3a_1$, $3a_2$ and $3b_1$, $3b_2$ and the carrier frame 62. It is possible also to contemplate positioning a sealing means between the housing 3 and the support frame 16 of the shut-off device 14, in the region of the air inlet 20.

Figure 7:
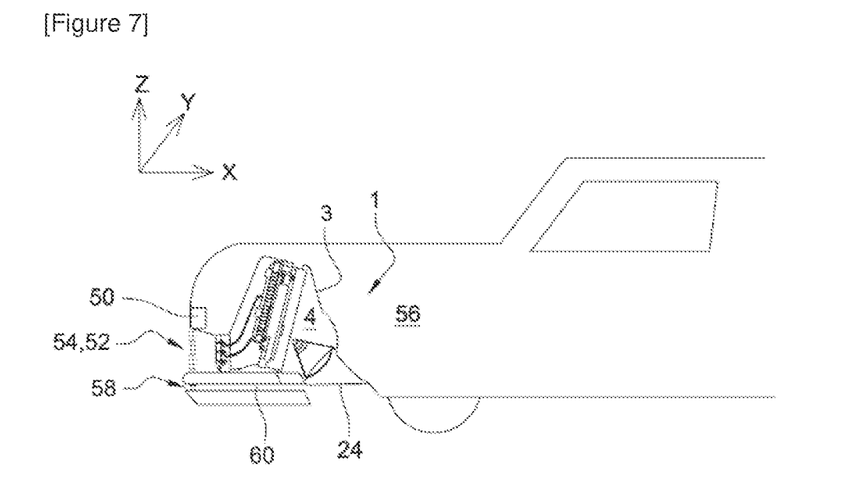
FIG. 7 schematically illustrates a motor vehicle comprising a front-end module according to a profile view;
h.

FIG. 7 illustrates a vertical cross section of a motor vehicle 1 in a longitudinal direction of the vehicle. The vehicle comprises a bumper beam 50 below which is placed a grille 52 or grid. This grille 52 is fixed and remains in the open position to allow an incoming air stream to pass through. The vehicle 1 according to the invention comprises a front-end module 2 as described above.

The motor vehicle 1 according to the invention therefore comprises an air inlet 54 provided with a grille 52 and a front-end module 2, arranged downstream with respect to an air stream, this air inlet. The outlet 22 of the flow duct 4 comprises a discharge duct 24 arranged to convey the air stream to the outside of the motor vehicle 1 and a cooling duct 26 arranged to convey the air stream to the engine compartment 56 of the vehicle.

The vehicle 1 according to the invention further comprises an additional inlet 58 as well as an additional duct 60 connecting said additional inlet 58 to the discharge duct 24 conveying the air stream to the outside of the vehicle. This makes it possible to accentuate the Venturi effect of the discharge duct 24, thus increasing the air flow rate circulating, thus improving the thermal efficiency. The additional inlet 58 can also be provided with a grille in order to prevent any foreign bodies (branches, leaves, etc.) from entering the additional duct 60.

The invention as has just been described is not limited to the means and configurations exclusively described for a particular exemplary embodiment, and also applies to all combinations of these means or configurations, as well as to equivalents and to any combination of such means or configurations with the equivalents.

The invention claimed is:

1. A housing for a front-end module of a motor vehicle, defining a flow duct for the flow of an air stream, said housing comprising:
    a perforated structure comprising a plurality of openings delimited by ribs surrounding the flow duct;
    a skin secured to the perforated structure, covering the openings so as to form a wall impervious to the air stream.

2. The housing as claimed in claim 1, wherein the perforated structure comprises at least 5 openings all delimited by the ribs.

3. The housing as claimed in claim 1, wherein the openings are at least partially arranged in a repeated pattern.

4. The housing as claimed in claim 1, wherein the ribs are at least partially arranged in a triangular mesh.

5. The housing as claimed in claim 1, wherein the thickness of the perforated structure is between 1 and 3 mm and the thickness of the skin is between 0.3 and 1 mm.

6. The housing as claimed in claim 1, wherein the perforated structure is made of a first material and the skin is made of a second material, the first and second materials being of different compositions.

7. The housing as claimed in claim 1, wherein the skin comprises an internal cavity.

8. The housing as claimed in claim 1, wherein the perforated structure is made of several parts not forming continuity of material, each part being secured to one another via the skin.

9. A front-end module comprising a housing for a front-end module of a motor vehicle, defining a flow duct for the flow of an air stream the module comprising:
    an air inlet and an air outlet;
    at least one heat exchanger being arranged within the flow duct; and
    a motor-fan unit being arranged downstream with respect to the air stream at the heat exchanger,
    the housing comprising a perforated structure with a plurality of openings delimited by ribs surrounding the flow duct, and a skin secured to the perforated structure, covering the openings to form a wall impervious to the air stream.

* * * * *